United States Patent
Klingeberg et al.

(10) Patent No.: US 11,965,121 B2
(45) Date of Patent: Apr. 23, 2024

(54) UV-CURABLE ADHESIVE TAPE AND METHOD FOR JACKETING ELONGATED ITEMS, ESPECIALLY LEADS

(71) Applicant: tesa SE, Norderstedt (DE)

(72) Inventors: Kerstin Klingeberg, Hamburg (DE); Lars Guldbrandsen, Barsbüttel (DE); Nadine Wedel, Hamburg (DE); Heike Simonis, Hamburg (DE); Christian Schuh, Hamburg (DE)

(73) Assignee: TESA SE, Norderstedt (DE)

( * ) Notice: Subject to any disclaimer, the term of this patent is extended or adjusted under 35 U.S.C. 154(b) by 986 days.

(21) Appl. No.: 16/785,847

(22) Filed: Feb. 10, 2020

(65) Prior Publication Data
US 2020/0255699 A1 Aug. 13, 2020

(51) Int. Cl.
*C09J 7/38* (2018.01)
*C09J 7/25* (2018.01)
(Continued)

(52) U.S. Cl.
CPC .............. *C09J 7/38* (2018.01); *C09J 7/255* (2018.01); *C09J 153/00* (2013.01); *C09J 163/00* (2013.01);
(Continued)

(58) Field of Classification Search
CPC ... C09J 7/38; C09J 7/255; C09J 153/00; C09J 163/00; C09J 163/04; C09J 2203/302; C09J 2301/414; C09J 2453/00; C09J 2463/00; C09J 2467/006; C09J 2301/416; C09J 2400/22; C09J 2400/263; C09J 7/21;
(Continued)

(56) References Cited

U.S. PATENT DOCUMENTS 3,018,262 A 1/1962 Schroeder et al.
3,117,099 A 1/1964 Proops et al.
(Continued)

FOREIGN PATENT DOCUMENTS

CN 103298661 A 9/2013
CN 104299726 A 1/2015
(Continued)

OTHER PUBLICATIONS

CN Office Action issued in corresponding application CN201811534791 dated Mar. 20, 2020.
(Continued)

*Primary Examiner* — Daniel H Lee
(74) *Attorney, Agent, or Firm* — Norris McLaughlin PA

(57) ABSTRACT

The present disclosure relates to an adhesive tape and to a method for jacketing an elongated item, more particularly cable sets. The adhesive tape comprises a tapelike carrier provided on at least one side with an adhesive layer which consists of a self-adhesive, pressure-sensitive adhesive, characterized in that the self-adhesive pressure-sensitive adhesive is a UV-curable composition comprising, based on the total weight of the composition: 15 to 50 parts by weight of matrix polymer; 50 to 85 parts by weight of epoxy resin; 0.1 to 3 parts by weight of photoinitiator, with the matrix polymer forming a self-supporting film in which epoxy resin and photoinitiator are embedded.

10 Claims, 1 Drawing Sheet

(51) Int. Cl.

| | | |
|---|---|---|
| *C09J 153/00* | (2006.01) | |
| *C09J 163/00* | (2006.01) | |
| *C09J 163/04* | (2006.01) | |
| *D06M 15/55* | (2006.01) | |
| *D06M 23/00* | (2006.01) | |
| *H01B 3/40* | (2006.01) | |
| *H01B 7/00* | (2006.01) | |
| *H01B 7/02* | (2006.01) | |
| *H01B 13/012* | (2006.01) | |

(52) U.S. Cl.
CPC ........... *C09J 163/04* (2013.01); *D06M 15/55* (2013.01); *D06M 23/00* (2013.01); *H01B 3/40* (2013.01); *H01B 7/0045* (2013.01); *H01B 7/0241* (2013.01); *H01B 13/01209* (2013.01); *H01B 13/01263* (2013.01); *C09J 2203/302* (2013.01); *C09J 2301/414* (2020.08); *C09J 2453/00* (2013.01); *C09J 2463/00* (2013.01); *C09J 2467/006* (2013.01); *Y10T 428/2809* (2015.01); *Y10T 428/287* (2015.01); *Y10T 428/2891* (2015.01)

(58) Field of Classification Search
CPC ........ C09J 7/385; D06M 15/55; D06M 23/00; H01B 3/40; H01B 7/0045; H01B 7/0241; H01B 13/01209; H01B 13/01263; H01B 7/17; H01B 13/01281; Y10T 428/2809; Y10T 428/287; Y10T 428/2891; C08L 2203/202; C08L 2205/03
See application file for complete search history.

(56) References Cited

U.S. PATENT DOCUMENTS

| | | | |
|---|---|---|---|
| 3,729,313 A | 4/1973 | Smith | |
| 3,741,769 A | 6/1973 | Smith | |
| 4,058,401 A | 11/1977 | Crivello | |
| 4,131,114 A | 12/1978 | Kirkpatrick et al. | |
| 4,138,255 A | 2/1979 | Crivello | |
| 4,231,951 A | 11/1980 | Smith et al. | |
| 4,250,053 A | 2/1981 | Smith | |
| 4,256,828 A | 3/1981 | Smith | |
| 4,322,516 A | 3/1982 | Wiest et al. | |
| 4,348,438 A | 9/1982 | Canterino et al. | |
| 4,376,438 A | 3/1983 | Staube et al. | |
| 4,394,403 A | 7/1983 | Smith | |
| 4,411,262 A | 10/1983 | Bonin et al. | |
| 4,433,680 A | 2/1984 | Yoon | |
| 4,502,479 A | 3/1985 | Garwood et al. | |
| 4,622,260 A | 11/1986 | Tesch | |
| 4,667,661 A | 5/1987 | Scholz et al. | |
| 4,831,077 A | 5/1989 | Ball et al. | |
| 4,881,995 A | 11/1989 | Arenz | |
| 5,804,510 A | 9/1998 | Spies et al. | |
| 5,944,674 A | 8/1999 | Richard et al. | |
| 6,005,191 A | 12/1999 | Tzeng et al. | |
| 6,358,220 B1 | 3/2002 | Angen et al. | |
| 6,595,938 B1 | 7/2003 | Delmore et al. | |
| 6,908,722 B2 | 6/2005 | Ebata et al. | |
| 7,279,541 B2 | 10/2007 | Centner et al. | |
| 7,851,542 B2 | 12/2010 | Michl et al. | |
| 9,613,733 B2 | 4/2017 | Siebert et al. | |
| 9,725,622 B2 | 8/2017 | Korthals et al. | |
| 10,519,344 B2 | 12/2019 | Korthals et al. | |
| 10,519,345 B2 | 12/2019 | Korthals et al. | |
| 2002/0182955 A1* | 12/2002 | Weglewski | G03F 7/038 442/59 |
| 2004/0097638 A1 | 5/2004 | Centner et al. | |
| 2004/0253889 A1 | 12/2004 | Mundt | |
| 2005/0004309 A1 | 1/2005 | Gerst et al. | |
| 2010/0063221 A1 | 3/2010 | Manabe et al. | |
| 2012/0279637 A1 | 11/2012 | Siebert et al. | |
| 2012/0279755 A1 | 11/2012 | Korthals et al. | |
| 2012/0282836 A1 | 11/2012 | Korthals et al. | |
| 2012/0282837 A1 | 11/2012 | Korthals et al. | |
| 2013/0277106 A1 | 10/2013 | Toyama | |
| 2014/0044960 A1 | 2/2014 | Gunzler et al. | |
| 2015/0013874 A1 | 1/2015 | Siebert et al. | |
| 2015/0013875 A1 | 1/2015 | Siebert et al. | |
| 2015/0380126 A1 | 12/2015 | Specht et al. | |
| 2016/0032150 A1 | 2/2016 | Gunzler et al. | |
| 2016/0326413 A1 | 11/2016 | Schuh et al. | |
| 2016/0333229 A1 | 11/2016 | Korthals et al. | |
| 2016/0333230 A1 | 11/2016 | Korthals et al. | |
| 2019/0077997 A1† | 3/2019 | Demarez | |
| 2019/0106601 A1 | 4/2019 | Hanle et al. | |
| 2019/0228885 A1 | 7/2019 | Boecker et al. | |
| 2020/0040237 A1† | 2/2020 | Kopf | |

FOREIGN PATENT DOCUMENTS

| | | | |
|---|---|---|---|
| DE | 3605192 A1 | 11/1986 | |
| DE | 3803318 C2 | 8/1989 | |
| DE | 3803318 A1 | 6/1990 | |
| DE | 9400574 U1 | 4/1994 | |
| DE | 19729161 A1 | 1/1999 | |
| DE | 10151569 A1 | 4/2003 | |
| DE | 10342858 A1 | 4/2005 | |
| DE | 102004061144 B1 | 6/2006 | |
| DE | 202004019761 U1 | 6/2006 | |
| DE | 60304353 T2 | 12/2006 | |
| DE | 10 2013 213 726 A1 | 1/2015 | |
| DE | 102013213726 A1 | 1/2015 | |
| DE | 102014109141 A1 | 12/2015 | |
| DE | 102015108365 A1 | 12/2016 | |
| DE | 102016220166 A1 | 4/2018 | |
| DE | 10 2017 001 696 A1 | 8/2018 | |
| DE | 102019103121 A1 | 8/2020 | |
| EP | 0 017 986 B1 | 10/1980 | |
| EP | 0017986 B1 | 12/1982 | |
| EP | 0 071 212 B1 | 2/1983 | |
| EP | 0 185 356 B1 | 6/1986 | |
| EP | 0260553 A2 | 9/1987 | |
| EP | 0326928 A1 | 1/1989 | |
| EP | 0343330 A2 | 11/1989 | |
| EP | 0 542 716 B1 | 5/1993 | |
| EP | 0647691 B1 | 1/1994 | |
| EP | 542716 B1 | 6/1997 | |
| EP | 1029521 A2 | 8/2000 | |
| EP | 1 448 744 B1 | 12/2005 | |
| EP | 1 848 006 A2 | 10/2007 | |
| EP | 1 378 527 B1 | 11/2008 | |
| EP | 2 497 805 A1 | 9/2012 | |
| EP | 2 520 627 A1 | 11/2012 | |
| EP | 2 520 628 A1 | 11/2012 | |
| EP | 2 520 629 A1 | 11/2012 | |
| EP | 2 522 705 A1 | 11/2012 | |
| EP | 2 695 926 A1 | 2/2014 | |
| JP | H09206246 A | 8/1987 | |
| JP | H04181609 A | 6/1992 | |
| JP | 04210182 A1 † | 7/1992 | |
| JP | H 04 210182 A | 7/1992 | |
| JP | H04210182 A | 7/1992 | |
| JP | 08216253 A | 8/1996 | |
| JP | H08216253 A | 8/1996 | |
| JP | 2008226587 A | 9/2008 | |
| JP | 2012142105 A | 7/2012 | |
| JP | 2012248527 | 12/2012 | |
| JP | 2014146506 A | 8/2014 | |
| JP | 2016533000 A | 10/2016 | |
| WO | 2012091173 A1 | 7/2012 | |
| WO | 2013132570 A1 | 9/2013 | |
| WO | 2015/004190 A1 | 1/2015 | |
| WO | 2015004190 A1 | 1/2015 | |
| WO | WO-2015004190 A1 * | 1/2015 | ............... C09J 7/21 |
| WO | 2017021487 A1 | 2/2017 | |
| WO | 2017/162737 A1 | 9/2017 | |
| WO | 2017155441 A1 | 9/2017 | |

(56) References Cited

FOREIGN PATENT DOCUMENTS

| WO | 2017155442 A1 | 9/2017 |
| WO | 2017/174303 A1 | 10/2017 |

OTHER PUBLICATIONS

Boerzel, "Acrodur: Die okologische Alternative zu duroplastischen Standard—Bindermitteln", Hofer Vliesstoffage, BASF, Nov. 10, 2005, pp. 1-23.
DE Patent Office Search Report for related application DE102019103121.45 dated Nov. 19, 2019.
Related application DE102019103122—DE Office Action dated Oct. 9, 2019.
Related application DE102019103121.4—DE Patent Office Search Report dated Nov. 19, 2019.
English translation of related application DE102019103122—DE Office Action dated Oct. 9, 2019.
Related application DE102019103123—DE Office Action dated Oct. 22, 2019.
Related U.S. Appl. No. 16/785,327—Document List in Third-Party Submission.
English translation of related application DE102019103123—DE Patent Office Action dated Oct. 22, 2019.
Related application DE102019103124—DE Office Action dated Oct. 14, 2019.
English translation of related elated application DE102019103124—DE Office Action dated Oct. 14, 2019.
Related U.S. Appl. No. 16/785,348—Concise Statement of Relevance.
Related application EP20156124—Concise Statement, EPO Search Report EP20156124.8 dated Jun. 26, 2020.
Related application EP20156125—EP Search Report and EP Office Action dated Jul. 10, 2020.
English translation of related application EP20156125.5 SearchReport and OfficeAction dated Jul. 10, 2020.
Related application EP20156127—EP SearchReport and OfficeAction dated Jul. 10, 2020.
English translation of related application EP20156127—EP SearchReport and OfficeAction dated Jul. 10, 2020.
Related application EP20156131—EP Search Report dated Jun. 24, 2020.
English translation of related application EP20156131—EP Search Report dated Jun. 25, 2020.
Related application EP20156133—EP Examination Report dated Jul. 10, 2020.
English translation of related application EP20156133—EP Examination Report dated Jul. 10, 2020.
Eastman, Technical Data Sheet, Regalite R1100 Hydrocarbon Resin, 2019, pp. 1-3.
Related application EP 3693433—EPO Search Report—excerpt, concise statement.
Simon, et al 'Gel permeationschromotographile (GPD) in der Polymeranalytik: Eine Kurze Einfuehrung' News Analytik, Mar. 28, 2013 pp. 1-5.
Related application U516785339—Third Party Submission and Concise Statements of Relevance.
Related U.S. Appl. No. 16/785,348—Third Party Submission and Concise Statement of Relevance.
Related U.S. Appl. No. 16/784,888—References cited in Third-Party Submission.
Related application U516784888—Third Party Submission and Concise Statements of Relevance.
Related application U516785321—Third Party Submission and Concise Statements of Relevance.
Related U.S. Appl. No. 16/785,327—References cited in Third-Party Submission.
Related U.S. Appl. No. 16/785,327—Third-Party Submission.
Related application U516785339—Concise Statement of Relevance.
Related U.S. Appl. No. 16/785,339—References Cited in Third Party Submission.
Taghleef, Nativa: NTSS, Seiten, pp. 1-2, Nov. 26, 2018.
Bulut U., Crivello J. V., J. Polym. Sci. 2005, 43, pp. 3205 to 3220.
Verschueren et al., "Cycloaliphatic epoxide resins for cationic UV-cure", UCB Chemicals, 1999, pp. 269-288.
Technical Data Sheet "Kraton G1657M"; Kraton Corporation, 2019.
Technical Data Sheet "Regalite R1100 Hydrocarbon Resin"; Eastman Chemical Company, 2018.
Acrodur 950L technical datasheet, BASF.
Third Party Submission in related U.S. Appl. No. 16/785,348 dated Feb. 12, 2021.
Machine Translation of WO 2015004190A1 published Jan. 15, 2015.
Pages from EPO search Report dated Jun. 26, 2020 in EP patent applicagtion20 156 124.8.†
German Patent Office search report dated Oct. 23, 2019 in German patent application 10 2019 103 120.6.†

\* cited by examiner
† cited by third party

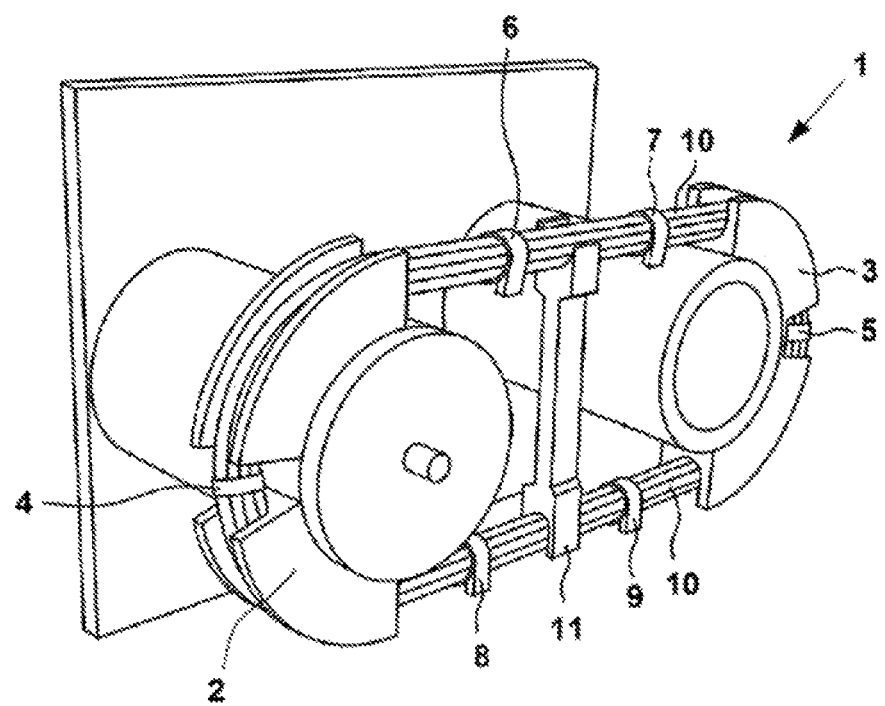

UV-CURABLE ADHESIVE TAPE AND METHOD FOR JACKETING ELONGATED ITEMS, ESPECIALLY LEADS

This application claims priority of German Patent Application No. 10 2019 103 120.6, filed Feb. 8, 2019, the entire contents of which are incorporated herein by reference.

The invention relates to an adhesive tape and to a method for jacketing elongated items, especially cable sets.

Adhesive tapes have long been used in industry for producing cable looms. The adhesive tapes are employed to bundle a multiplicity of electrical leads prior to installation or in an already assembled state, in order, for example, to reduce the space taken up by the bundle of leads, by bandaging them, and additionally to achieve protective functions such as protection from mechanical and/or thermal stressing. Common forms of adhesive tapes comprise film carriers or textile carriers, which in general are coated on one side with pressure sensitive adhesives. Adhesive tapes for the wrapping of elongated items are known from, for example, EP 1 848 006 A2, DE 10 2013 213 726 A1, and EP 2 497 805 A1.

The present cable harnesses swathed with adhesive tape are generally flexible. This flexibility is often undesirable, however, for technical reasons associated with manufacture. In manufacture, the cable harnesses are generally prefabricated to make up a cable plan, and then inserted into the object which is to be equipped—such as motor vehicles, for example. A cable set plan corresponds to the actual three-dimensional disposition of the individual cable harnesses in the cable set—that is, which cable harness is bent at which point in which angle, where positions of branches or out-bindings are located, and with which connectors the ends of the cable harnesses are fitted.

In order to hold the individual harnesses of the cable set in a defined shape, allowing them to be guided around the engine in the engine compartment, for example, without coming into contact with the engine, it is usual to mount injection-moulded components subsequently around the cable loom swathed with adhesive tape. A disadvantage of these injection-moulded components, however, is that they entail additional material and additional assembly effort.

WO 2015/004190 A1 discloses a method for jacketing elongated items such as, more particularly, leads or cable sets, wherein the elongated item is wrapped with an adhesive tape, with curable adhesive applied thereon, in a helical line or in an axial direction, and the adhesive applied on the adhesive tape is cured by supply of radiant energy such as heat. For the thermal curing in that case a temperature of 175° C. is employed.

A disadvantage of that method is the high curing temperature, which is of little practicability in the assembly of cable harnesses during the manufacturing operation in the automotive industry, for example, especially since the cable insulation, which is often fabricated from PVC, may be damaged. Consequently, cable plans have to date been laid only in prefabricated, injection-moulded shapes. This entails a high level of manufacturing effort.

Desirable adhesive tapes are therefore those which cure at 110° C. at most, preferably 100° C. at most, and more preferably at about room temperature, allowing the wrapping of adhesive tapes to be integrated into the operation of manufacturing the cable looms or cable plans. The adhesive tapes must after curing exhibit the required dimensional stability properties. Moreover, the adhesives must not cure during storage itself, since otherwise they are no longer usable. Lastly, curing is to take place within the cycle time of the production operation (around 6 minutes).

It is therefore an object of the present invention to provide an adhesive tape for jacketing elongated items that meets the requirements described above. Another object of the present invention is to provide a method for wrapping elongated items using the rigid adhesive tape of the invention, and also a product obtainable with the method.

Proposed as a solution to the technical problems is an adhesive tape for jacketing elongated items, comprising a tapelike carrier provided on at least one side with an adhesive layer which consists of a self-adhesive, pressure-sensitive adhesive, characterized in that the self-adhesive pressure-sensitive adhesive is a UV-curable composition comprising:

15 to 50 parts by weight, preferably 20-40 parts by weight, of matrix polymer;
50 to 85, preferably 60 to 75, parts by weight of epoxy resin;
0.1 to 3 parts by weight of photoinitiator, with the matrix polymer forming a self-supporting film in which epoxy resin and photoinitiator are embedded.

BRIEF DESCRIPTION OF THE DRAWING

The invention will now be described in greater detail with reference to the drawing, wherein:

FIG. 1 is an illustration of a wound cable set.

According to one embodiment of the invention, the elongated item is a cable harness which comprises a bundle of a plurality of cables, such as 3 to 1000 cables, preferably 10 to 500 cables, more particularly between 50 and 300 cables.

The matrix polymer is preferably selected from the group consisting of styrene copolymers, acrylate copolymers, methacrylate copolymers, thermoplastic polyurethanes, copolyesters, copolyamides and ethylene-vinyl acetate copolymers and mixtures thereof.

As epoxy resin(s) of the UV-curable composition it is possible to use a single epoxy resin or a mixture of epoxy resins. In principle it is possible to use epoxy resins which are liquid at room temperature or epoxy resins which are solid at room temperature, or mixtures of these.

Examples, without wishing to impose any limitation, are 3,4-epoxycyclohexylmethyl 3',4'-epoxycyclohexanecarboxylate (EEC) and derivatives, dycyclopentadiene dioxide and derivatives, 3-ethyl-3-oxetanemethanol and derivatives, diglycidyl tetrahydrophthaiate and derivatives, diglycidyl hexahydrophthalate and derivatives, ethane 1,2-diglycidyl ether and derivatives, propane 1,3-diglycidyl ether and derivatives, 1,4-butanediol diglycidyl ether and derivatives, higher alkane 1,n-diglycidyl ethers and derivatives bis[(3,4-epoxycyclohexyl)methyl] adipate and derivatives, vinylcyclohexyl dioxide and derivatives, 1,4-cyclohexanedimethanol bis(3,4-epoxycyclohexanecarboxylate) and derivatives, diglycidyl 4,5-epoxytetrahydrophthalate and derivatives, bis[1-ethyl(3-oxetanyl)methyl] ether and derivatives, pentaerythritol tetraglycidyl ether and derivatives, bisphenol A diglycidyl ether (DGEBA), hydrogenated bisphenol A diglycidyl ether, bisphenol F diglycidyl ether, hydrogenated bisphenol F diglycidyl ether, epoxyphenol novolacs, hydrogenated epoxyphenol novolacs, epoxycresol novolacs, hydrogenated epoxycresol novolac, 2-(7-oxabicyclo[4.1.0]hept-3-yl) spiro[1,3-dioxane-5,3'-[7]oxabicyclo[4.1.0]heptane], 1,4-bis((2,3-epoxypropoxy)methyl)cyclohexane.

Reactive resins may be used in their monomeric form or else in their dimeric, trimeric, and so on up to their oligomeric form.

The epoxy resin or at least one of the epoxy resins is preferably a solid, more particularly a solid having a softening temperature of at least 45° C. or a solid having a viscosity at 25° C. of at least 20 Pa·s, more preferably at least 50 Pa·s, more particularly at least 150 Pa·s (determined according to DIN 53019-1 at 25° C. and a shear rate of 1 $s^{-1}$).

In one preferred embodiment of the adhesive tape of the invention, the epoxy resins comprise a mixture of epoxy resins liquid at 25° C. and epoxy resins solid at 25° C. The fraction of the liquid epoxy resins among the epoxy resins (E) is more particularly 10 to 90 wt %, more preferably 20 to 75 wt %. The respective difference to 100 wt % of the epoxy resins is then made up of solid epoxy resins. Adhesive tapes with ratios of this kind between liquid and solid epoxy components exhibit particularly balanced adhesive properties in the uncured state. Where an adhesive tape having particularly good flow-on properties is desired, the fraction of liquid epoxy components is preferably 50 to 80 wt %. For applications in which the adhesive tapes are required to carry a relatively high load even in the uncured state, a fraction of 15 to 45 wt % is particularly preferred. It is possible to use one such resin or else a mixture of different resins.

With further preference the epoxy resins comprise at least two different epoxy resins (E-1) and (E-2), of which
   a. the first epoxy resin (E-1) at 25° C. has a dynamic viscosity of less than 500 Pa·s, measured according to DIN 53019-1 at a measuring temperature of 25° C. and a shear rate of 1 $s^{-1}$, and
   b. the second epoxy resin (E-2) has a softening temperature of at least 45° C. or at 25° C. a dynamic viscosity of at least 1000 Pa·s, measured according to DIN 53019-1 at a measuring temperature of 25° C. and a shear rate of 1 $s^{-1}$,
   where in particular the fraction of the first epoxy resin (E-1) is 10 to 90 wt %, preferably 20 to 75 wt %, and the fraction of the second epoxy resin (E-2) is 10 to 90 wt %, preferably 25 to 80 wt %, based on the entirety of epoxy resins. The epoxy resin component advantageously consists of these two epoxy resins (E-1) and (E-2), and accordingly the fractions of the two epoxy resins (E-1) and (E-2) as a proportion of the total epoxy resin add up to 100 wt %.

Particularly good pressure sensitive adhesives are obtained if the fraction of epoxy resin (E2) is in the range from 40 to 80 wt %, more particularly 60 to 75 wt %. In one specific embodiment the fraction of epoxy resins (E-2) having a softening temperature of at least 45° C. is at least 35 wt %, more particularly in the 40 to 70 wt % range.

The cohesion of the non-crosslinked pressure sensitive adhesives is particularly good, while still maintaining sufficient pressure-sensitive tack, if the fraction of epoxy resins having a softening temperature of at least 45° C. is at least 15 wt %, being situated more particularly in the range from 20 wt % to 75 wt %, based on the total epoxy resin. The flow-on characteristics are improved if there is less than 55 wt %, more particularly between 25 wt % and 45 wt %.

The adhesive formulation further comprises at least one kind of a photoinitiator for the cationic curing of the reactive resins. Among the initiators for cationic UV curing it is possible more particularly to use sulfonium, iodonium and metallocene based systems.

As examples of sulfonium based cations, reference may be made to the statements in U.S. Pat. No. 6,908,722 B1 (especially columns 10 to 21).

As examples of anions which serve as counterions for the above-stated cations, reference may be made to tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bis(trifluoromethylsulfonyl)amide and tris(trifluoromethylsulfonyl)methide. Especially for iodonium-based initiators, furthermore, consideration may also be given to chloride, bromide or iodide as anions, although initiators substantially free from chlorine and bromine are preferred.

By way of example, the systems which can be used include
   Sulfonium salts (see, for example, U.S. Pat. Nos. 4,231,951 A, 4,256,828 A, 4,058,401 A, 4,138,255 A and U.S. 2010/063221 A1) such as triphenylsulfonium hexafluoroarsenate, triphenylsulfonium hexafluoroborate, triphenylsulfonium tetrafluoroborate, triphenylsulfonium tetrakis(pentafluorobenzyl)borate, methyldiphenylsulfonium tetrafluoroborate, methyldiphenylsulfonium tetrakis(pentafluorobenzyl)borate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, anisyldiphenylsulfonium hexafluoroantimonate, 4-butoxyphenyldiphenylsulfonium tetrafluoroborate, 4-butoxyphenyldiphenylsulfonium tetrakis(pentafluorobenzyl)borate, 4-chlorophenyldiphenylsulfonium hexafluoroantimonate, tris(4-phenoxyphenyl)sulfonium hexafluorophosphate, di(4-ethoxyphenyl)methylsulfonium hexafluoroarsenate, 4-acetylphenyldiphenylsulfonium tetrafluoroborate, 4-acetylphenyldiphenylsulfonium tetrakis(pentafluorobenzyl)borate, tris(4-thiomethoxyphenyl)sulfonium hexafluorophosphate, di(methoxysulfonylphenyl)methylsulfonium hexafluoroantimonate, di(methoxynaphthyl)methylsulfonium tetrafluoroborate, di(methoxynaphthyl)methylsulfonium tetrakis(pentafluorobenzyl)borate, di(carbomethoxyphenyl)methylsulfonium hexafluorophosphate, (4-octyloxyphenyl)diphenylsulfonium tetrakis(3,5-bistrifluoromethylphenyl)borate, tris[4(4-acetylphenyl)-thiophenyl]sulfonium tetrakis(pentafluorophenyl)borate, tris(dodecylphenyl)sulfonium tetrakis(3,5-bistrifluoromethylphenyl)borate, 4-acetamidophenyldiphenylsulfonium tetrafluoroborate, 4-acetamidophenyldiphenylsulfonium tetrakis(pentafluorobenzyl)borate, dimethylnaphthylsulfonium hexafluorophosphate, trifluoromethyldiphenylsulfonium tetrafluoroborate, trifluoromethyldiphenylsulfonium tetrakis(pentafluorobenzyl)borate, phenylmethylbenzylsulfonium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 10-phenyl-9-oxothioxanthenium tetrakis(pentafluorobenzyl)borate, 5-methyl-10-oxothianthrenium tetrafluoroborate, 5-methyl-10-oxothianthrenium tetrakis(pentafluorobenzyl)borate and 5-methyl-10,10-dioxothianthrenium hexafluorophosphate,
   Iodonium salts (see, for example, U.S. Pat. Nos. 3,729,313 A, 3,741,769 A, 4,250,053 A, 4,394,403 A and U.S.

2010/063221 A1) such as diphenyliodonium tetrafluoroborate, di(4-methylphenyl)iodonium tetrafluoroborate, phenyl-4-methylphenyliodonium tetrafluoroborate, di(4-chlorophenyl)iodonium hexafluorophosphate, dinaphthyliodonium tetrafluoroborate, di(4-trifluoromethylphenyl)iodonium tetrafluoroborate, diphenyliodonium hexafluorophosphate, di(4-methylphenyl)iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, Diphenyliodonium hexafluoroantimonate, 2,2'-diphenyliodonium tetrafluoroborate, di(2,4-dichlorophenyl)iodonium hexafluorophosphate, di(4-bromphenyl)iodonium hexafluorophosphate, di(4-methoxyphenyl)iodonium hexafluorophosphate, di(3-carboxyphenyl)iodonium hexafluorophosphate, di(3-methoxycarbonylphenyl)iodonium hexafluorophosphate, di(3-methoxysulfonylphenyl)iodonium hexafluorophosphate, di(4-acetamidophenyl)iodonium hexafluorophosphate, di(2-benzothienyl)iodonium hexafluorophosphate, diaryliodonium tristrifluoromethylsulfonylmethide such as diphenyliodonium hexafluoroantimonate, diaryliodonium tetrakis(pentafluorophenyl)borate such as diphenyliodonium tetrakis(pentafluorophenyl)borate, (4-n-disiloxyphenyl)phenyliodonium hexafluoroantimonate, [4(2-hydroxy-n-tetradesiloxy)phenyl]phenyliodonium hexafluoroantimonate, [4(2-hydroxy-n-tetradesiloxy) phenyl]phenyliodonium trifluorosulfonate, [4(2-hydroxy-n-tetradesiloxy)phenyl]phenyliodonium hexafluorophosphate, [4(2-hydroxy-n-tetradesiloxy) phenyl]phenyliodonium tetrakis(pentafluorophenyl) borate, bis(4-tert-butylphenyl)iodonium hexafluoroantimonate, bis(4-tert-butylphenyl)iodonium hexafluorophosphate, bis(4-tert-butylphenyl)iodonium trifluorosulfonate, bis(4-tert-butylphenyl)iodonium tetrafluoroborate, bis(dodecylphenyl)iodonium hexafluoroantimonate, bis(dodecylphenyl)iodonium tetrafluoroborate, bis(dodecylphenyl)iodonium hexafluorophosphate, bis(dodecylphenyl)iodonium trifluoromethylsulfonate, di(dodecylphenyl)iodonium hexafluoroantimonate, di(dodecylphenyl)iodonium triflate, diphenyliodonium bisulfate, 4,4'-dichlorodiphenyliodonium bisulfate, 4,4'-dibromodiphenyliodonium bisulfate, 3,3'-dinitrodiphenyliodonium bisulfate, 4,4'-dimethyldiphenyliodonium bisulfate, 4,4'-bissuccinimidodiphenyliodonium bisulfate, 3-nitrodiphenyliodonium bisulfate, 4,4'-dimethoxydiphenyliodonium bisulfate, bis(dodecylphenyl)iodonium tetrakis(pentafluorophenyl)borate, (4-octyloxyphenyl)phenyliodonium tetrakis(3,5-bistrifluoromethylphenyl) borate and (tolylcumyl)iodonium tetrakis(pentafluorophenyl)borate, and ferrocenium salts (see, for example, EP 542 716 B1) such as η$^5$-(2,4-cyclopentadien-1-yl)[(1,2,3,4,5,6,9) (1-methylethyl)benzene] iron.

Examples of commercialized photoinitiators are Cyracure UVI-6990, Cyracure UVI-6992, Cyracure UVI-6974 and Cyracure UVI-6976 from Union Carbide, Optomer SP-55, Optomer SP-150, Optomer SP-151, Optomer SP-170 and Optomer SP-172 from Adeka, San-Aid SI-45L, San-Aid SI-60L, San-Aid SI-80L, San-Aid SI-100L, San-Aid SI-110L, San-Aid SI-150L and San-Aid SI-180L from Sanshin Chemical, SarCat CD-1010, SarCat CD-1011 and SarCat CD-1012 from Sartomer, Degacure K185 from Degussa, Rhodorsil Photoinitiator 2074 from Rhodia, CI-2481, CI-2624, CI-2639, CI-2064, CI-2734, CI-2855, CI-2823 and CI-2758 from Nippon Soda, Omnicat 320, Omnicat 430, Omnicat 432, Omnicat 440, Omnicat 445, Omnicat 550, Omnicat 550 BL and Omnicat 650 from IGM Resins, Daicat II from Daicel, UVAC 1591 from Daicel-Cytec, FFC 509 from 3M, BBI-102, BBI-103, BBI-105, BBI-106, BBI-109, BBI-110, BBI-201, BBI-301, BI-105, DPI-105, DPI-106, DPI-109, DPI-201, DTS-102, DTS-103, DTS-105, NDS-103, NDS-105, NDS-155, NDS-159, NDS-165, TPS-102, TPS-103, TPS-105, TPS-106, TPS-109, TPS-1000, MDS-103, MDS-105, MDS-109, MDS-205, MPI-103, MPI-105, MPI-106, MPI-109, DS-100, DS-101, MBZ-101, MBZ-201, MBZ-301, NAI-100, NAI-101, NAI-105, NAI-106, NAI-109, NAI-1002, NAI-1003, NAI-1004, NB-101, NB-201, NDI-101, NDI-105, NDI-106, NDI-109, PAI-01, PAI-101, PAI-106, PAI-1001, PI-105, PI-106, PI-109, PYR-100, SI-101, SI-105, SI-106 and SI-109 from Midori Kagaku, Kayacure PCI-204, Kayacure PCI-205, Kayacure PCI-615, Kayacure PCI-625, Kayarad 220 and Kayarad 620, PCI-061T, PCI-062T, PCI-020T, PCI-022T from Nippon Kayaku, TS-01 and TS-91 from Sanwa Chemical, Deuteron UV 1240 from Deuteron, Tego Photocompound 1465N from Evonik, UV 9380 C-D1 from GE Bayer Silicones, FX 512 from Cytec, Silicolease UV Cata 211 from Bluestar Silicones and Irgacure 250, Irgacure 261, Irgacure 270, Irgacure PAG 103, Irgacure PAG 121, Irgacure PAG 203, Irgacure PAG 290, Irgacure CGI 725, Irgacure CGI 1380, Irgacure CGI 1907 and Irgacure GSID 26-1 from BASF.

The skilled person is aware of further systems which can likewise be employed in the invention. Photoinitiators are used uncombined or as a combination of two or more photoinitiators.

Advantageous photoinitiators are those which exhibit absorption at less than 350 nm and advantageously at greater than 250 nm. Initiators which absorb at above 350 nm, in the violet light range, for example, are likewise employable. Sulfonium-based photoinitiators are used with particular preference, on account of their advantageous UV absorption characteristics.

It is possible, furthermore, to use photosensitizers which in a redox process reduce the photoinitiator. In this process the photoinitiator itself is decomposed, forming reactive cations which are able to initiate a cationic polymerization. This mode of reaction regime allows the cationic polymerization to be initiated at relatively high wavelengths. Examples of such photosensitizers are diphenolmethanone and derivatives, acetophenone derivatives such as, for example, Irgacure 651, anthracene derivatives such as 2-ethyl-9,10-dimethoxyanthracene and 9-hydroxymethylanthracene, phenylketone derivatives such as 1-hydroxycyclohexyl phenyl ketone, 2-hydroxy-2-methyl-1-phenylpropan-1-one and 4-(2-hydroxyethoxy) phenyl (2-hydroxy-2-methylpropyl) ketone (Irgacure 184, Darocur 1173, Irgacure 2959) and also thioxanthenone derivatives such as 4-isopropyl-9-thioxanthenone or 1-chloro-4-propoxythioxanthenone.

Particularly preferred combinations of photoinitiator and sensitizer take account of the different redox potentials and retardation potentials of intermediates, as is the case for combinations of diaryliodonium based photoinitiators with acetophenone sensitizers and is described in Bulut U., Crivello J. V., J. Polym. Sci. 2005, 43, pages 3205 to 3220.

The adhesive tape of the invention comprises matrix polymer which incorporates the curable composition comprising at least one epoxy resin and also at least one curing reagent for the epoxy resin. Adhesive tapes of this kind therefore comprise an adhesive film which fundamentally is formed of a matrix polymer having embedded within it the curable composition which serves in particular as a reactive adhesive. The matrix polymer here forms a self-supporting, three-dimensional film (where the spatial extent of the film in the thickness direction is generally very much smaller than the spatial extents in the longitudinal and transverse directions, in other words than in the two directions in space of the areal extent of the film; regarding the meaning of the term "film", see also later on below in this regard). In this matrix polymer, the curable composition, especially the reactive adhesive, has a preferably substantially uniform (homogeneous) spatial distribution, in particular in such a way that the reactive adhesive—which without the matrix might not be self-supporting—occupies essentially the same (macroscopic) distribution in space in the adhesive film of the invention as does the matrix polymer.

The function of the matrix polymer is to form an inert scaffold for the reactive monomers and/or reactive resins, so that the latter are incorporated in a film or a sheet. Accordingly it is also possible for systems which are otherwise liquid to be offered in film form. This ensures greater ease of handling. The parent polymers of the matrix are capable of forming a self-supporting film through sufficient interactions of the macromolecules with one another, for example—without wishing to impose any unnecessary restriction on the concept of the invention—by formation of a network on the basis of physical and/or chemical crosslinking.

Inert in this context means that the reactive monomers and/or reactive resins, under appropriately selected conditions (e.g. at sufficiently low temperatures), exhibit substantially no reaction with the polymeric film-former matrix.

Suitable film-former matrices used in the present invention are preferably a thermoplastic homopolymer or a thermoplastic copolymer, or a blend of thermoplastic homopolymers or of thermoplastic copolymers or of one or more thermoplastic homopolymers with one or more thermoplastic copolymers. One preferred procedure makes use, entirely or in part, of semicrystalline thermoplastic polymers.

As thermoplastic polymers it is possible in principle to select, for example, polyesters, copolyesters, polyamides, poly(ethylene-co-vinyl acetate), copolyamides, polyacrylic esters, acrylic ester copolymers, polymethacrylic esters, methacrylic ester copolymers, thermoplastic polyurethanes, and also chemically or physically crosslinked substances of the aforementioned compounds. The stated polymers may each be used as a single polymer or as a component of a blend.

According to one preferred embodiment, the polymers comprise copolymer units. Particularly preferred among the styrene copolymers are styrene rubber block copolymers such as styrene-butadiene-styrene block copolymers, styrene-isoprene-styrene block copolymers and also styrene-ethylene/butylene-styrene block copolymers (SEBS) and styrene-ethylene/propylene-styrene block copolymers (SEPS). Particularly preferred among the acrylates and methacrylates are acrylate and/or methacrylate copolymers, examples being methacrylate and/or acrylate copolymers containing glycidyl acrylate. Preferred ethylene-vinyl acetate copolymers possess a vinyl acetate fraction of between 40% and 90%, such as 50% to 70%. Suitable ethylene-vinyl acetate copolymers preferably have a Mooney viscosity (ML (1+4)/100° C.) of between 15 and 45, preferably between 20 and 30. They are available, for example, under the tradename Levapren® from Lanxess. Particularly preferred for use is Levapren® having a vinyl acetate fraction of about 60% and a Mooney viscosity (ML (1+4)/100° C.) of 27±4. Preferred styrene copolymers have a styrene content of between 15% and 50%, preferably 25% to 40%. Suitable styrene copolymers preferably have a Brookfield viscosity (10% w) of 250 to 2500. Particularly preferred among the styrene copolymers are SEBS block copolymers. One such copolymer is available, for example, under the tradename Kraton® G1651, with a styrene content of about 30% and a Brookfield viscosity (10% w) of 1800. The stated polymers may be used in each case as a single polymer or as a component of a blend.

As carriers it is possible to use all known sheets and textile carriers such as drawn-loop knits, laid scrims, tapes, braids, needle pile textiles, felts, wovens (comprising plain, twill and satin weaves), formed-loop knits (comprising warp-knitted fabric and knitwear fabric) or nonwovens, where "nonwoven" is to be understood as meaning at least textile sheetlike structures according to EN 29092 (1988) and also stitchbonded webs and similar systems. Particularly advantageous is an adhesive tape in which the carrier used is a woven, a nonwoven or a formed-loop knit. Carriers of these kinds are described for example in WO 2015/004190 A1, hereby referenced in its entirety.

A further possibility is to use spacer fabrics formed by weaving or formed-loop knitting, with lamination. Woven spacer fabrics of this kind are disclosed in EP 0 071 212 B1. Woven spacer fabrics are matt-shaped layered elements with a top layer comprising a fibre or filament web, a bottom layer and, between these layers, individual or bushels of holding fibres needled through the particle layer in a distributed form across the area of the layered element, and the top and bottom layers joined to one another.

Particularly suitable nonwoven fabrics are consolidated staple fibre webs, but also filament webs, meltblown webs and spunbonded webs, which usually require additional consolidation. Possible methods of consolidation known for webs are mechanical, thermal and chemical consolidation. Having proven to be particularly advantageous are webs consolidated in particular by overstitching with separate threads or by interlooping. Consolidated webs of these kinds are produced for example on stitchbonding machines of the "Malimo" type from Karl Mayer, formerly Malimo, and can be purchased from companies including Hoftex Group AG.

The carrier used may additionally be a Kunit or Multiknit web. A Kunit web is characterized in that it originates from the processing of a longitudinally oriented fibre web to form a sheetlike structure which has loops on one side and, on the other side, loop feet or pile fibre folds, but possesses neither threads nor prefabricated sheetlike structures. A nonwoven web of this kind as well has already been produced for some considerable time on stitchbonding machines of the "Malimo" type from Karl Mayer, for example.

A Multiknit web is characterized relative to the Kunit web in that the web experiences consolidation on both the top and bottom sides by virtue of the double-sided needle punching. Serving in general as a starting product for a Multiknit are one or two single-sidedly interlooped pile fibre stitchbonded fabrics produced by the Kunit process. In the end product, the two facing sides of the fabric are shaped by fibre interlooping to form a closed surface, and are joined to one another by fibres which stand almost perpendicular. It is possible additionally to incorporate further punchable sheet-like structures and/or scatterable media.

Also suitable, lastly, are stitchbonded nonwovens as a precursor to the formation of a carrier of the invention and an adhesive tape of the invention. A stitchbonded nonwoven is formed from a nonwoven web material having a large number of mutually parallel seams. These seams are formed by the stitched or knitted incorporation of continuous textile threads. For this type of nonwoven web, stitchbonding machines of the "Malimo" type from Karl Mayer are known.

Also particularly suitable are needle felt webs. In a needle felt, a fibre web is converted into a sheetlike structure by means of barbed needles. The needles are alternatingly punched into and pulled out of the material in order to consolidate it on a needle beam, with the individual fibres becoming entangled to form a firm sheetlike structure.

Additionally particularly advantageous is a staple fibre web, which in a first step is preconsolidated by mechanical working or which is a wet-laid web laid hydrodynamically, where between 2 wt % and 50 wt % of the fibres of the web are fusible fibres, more particularly between 5 wt % and 40 wt % of the fibres in the web. A nonwoven web of this kind is characterized in that the fibres are laid wet or, for example, a staple fibre web is preconsolidated by the formation of loops from fibres of the web, by needling, stitching, air and/or water jet processing. A second step is that of heat setting, where the strength of the web is further increased by the complete or partial melting of the fusible fibres.

Advantageously and at least regionally, the carrier has a single-sidedly or double-sidedly polished surface, preferably in each case a fully polished surface. The polished surface may be chintzed, as explained in EP 1 448 744 A1, for example. This enhances the dirt repellency.

Starting materials intended for the carrier are in particular (manmade) fibres (staple fibre or continuous filament) made from synthetic polymers, also called synthetic fibres, of polyester such as polyethylene terephthalate, polyamide, polyimide, aramid, polyolefin, polyacrylonitrile or glass, (manmade) fibres formed from natural polymers such as cellulosic fibres (viscose, Modal, lyocell, cupro, acetate, triacetate, cellulon), such as rubber fibres, such as plant protein fibres and/or such as animal protein fibres and/or natural fibres of cotton, sisal, flax, silk, hemp, linen, coconut or wool. The present invention, however, is not confined to the materials stated; instead, recognizably for the skilled person with no inventive step required, it is possible to use a large number of further fibres to produce the nonwoven web.

Likewise suitable, furthermore, are yarns fabricated from the raw materials stated. In the case of woven fabrics or laid scrims, individual threads may be produced from a blended yarn, and thus may have synthetic and natural constituents. Generally speaking, however, the warp threads and the weft threads are each formed of a pure variety of yarn.

Polyester is used with preference as a material for the carrier, owing to the outstanding ageing resistance and the outstanding media resistance with respect to chemicals and service fluids such as oil, petrol, antifreeze and the like. A further advantage of the polyester is that of leading to a highly abrasion-resistant and temperature-stable carrier, this being particularly important for the specific end use for the bundling of cables in motor vehicles and, for example, in the engine compartment.

With particular advantage the carrier material is UV-transparent.

The basis weight of the textile carrier is advantageously between 30 g/m$^2$ and 300 g/m$^2$, more advantageously between 50 g/m$^2$ and 200 g/m$^2$, particularly advantageously between 50 g/m$^2$ and 150 g/m$^2$, very advantageously between 70 g/m$^2$ and 130 g/m$^2$.

According to one particularly advantageous embodiment of the invention, carriers used comprise a woven or nonwoven fabric made of polyester, and have a basis weight of between 50 g/m$^2$ and 150 g/m$^2$.

According to a further embodiment of the invention, PET sheets are used as carriers. The thickness of the PET sheets is preferably from 10 µm to 50 µm, e.g. of about 12 µm, about 23 µm or about 50 µm.

The coat weight of the UV-curable composition applied to and/or introduced into the carrier is advantageously between 50 g/m$^2$ and 500 g/m$^2$, more advantageously between 100 g/m$^2$ and 250 g/m$^2$, particularly advantageously between 100 g/m$^2$ and 200 g/m$^2$. According to one preferred embodiment of the invention, the adhesive, after application to and/or introduction into the carrier, especially to a nonwoven carrier, has been absorbed to an extent of more than 10%, or preferably more than 25%, more preferably more than 50% into the carrier. A numerical value of 25%, for example, here means that the adhesive has penetrated the thickness of the textile carrier over a layer thickness of 25%—that is, in the case of a carrier having a thickness of 100 µm, it has penetrated over a layer thickness of 25 µm within the carrier—beginning from the surface of the carrier on which the adhesive has been coated, and in a direction perpendicular to the plane generated by the longitudinal and transverse directions, respectively.

Introduction into the carrier, especially into a nonwoven or woven carrier, may be accomplished, for example, by impregnating the carrier with the UV-curable composition.

According to one embodiment of the invention, the tape with the UV-curable composition additionally further comprises a pressure sensitive adhesive, meaning that the tape is fixed on the elongated item after wrapping and before curing.

The adhesive is a pressure sensitive adhesive (PSA), in other words an adhesive which even under relatively weak applied pressure allows durable bonding to virtually all substrates and which after use can be detached from the substrate again substantially without residue. A PSA has a permanent pressure-sensitive tack at room temperature, thus possessing sufficiently low viscosity and a high touch stickiness, and so it wets the surface of the bonding substrate in question even at low applied pressure. The bondability of the adhesive derives from its adhesive properties, and the redetachability from its cohesive properties.

In accordance with the invention, the adhesive used is a structure adhesive, (construction adhesive, assembly adhesive) (see Römpp, Georg Thieme Verlag, document coding RD-19-04489, last update: September 2012). According to DIN EN 923: 2006-01, structural adhesives are adhesives forming bonds capable of sustaining in a structure a specified strength for a defined longer period of time (according to the ASTM definition: "bonding agents used for transferring required loads between adherends exposed to service environments typical for the structure involved"). They are therefore adhesives for bonds which are highly robust both chemically and physically, and in the cured state they contribute to strengthening the bonded substrates and are used for producing structures made from metals, ceramic, concrete, wood or reinforced plastics. The structural adhesives of the invention are based in particular on reactive adhesives (phenolic resins, epoxy resins, polyimides, polyurethanes and others). The adhesive may after curing be elastic, so as to ensure a long-lasting jacketing which is insensitive to vibration and twisting.

Preferred PSAs are those as described in published European patent applications EP 2 520 627 A1, EP 2 522 705 A1, EP 2 520 628 A1, EP 2 695 926 A1, EP 2 520 629 A1 and EP 3 433 330 A1, incorporated here by reference.

According to one first embodiment the PSA is in the form of a dried polymer dispersion, and the polymer being composed of: 5 to 25 wt %, preferably 10 to 22 wt % of ethylene, 30 to 69 wt %, preferably 40 to 60 wt %, of alkyl acrylate esters with $C_4$ to $C_{12}$ alkyl radicals, 20 to 55 wt %, preferably 28 to 38 wt %, of vinyl acetate, 0 to 10 wt % of other ethylenically unsaturated compounds, and the PSA contains between 15 and 100 parts by weight of a tackifier (based on the mass of the dried polymer dispersion), as described in EP 2 520 627 A1. Preferably the alkyl acrylate ester is n-butyl acrylate and/or 2-ethylhexyl acrylate. Other ethylenically unsaturated compounds encompass alkyl (meth)acrylates, preferably $C_1$ to $C_{20}$ alkyl (meth)acrylates with the exception of the monomers forming the alkyl acrylate esters with $C_4$ to $C_{12}$ alkyl radicals; aromatic vinyl monomers such as styrene, α-methylstyrene and vinyltoluene, $C_1$ to $C_{10}$ hydroxyalkyl (meth)acrylates such as, in particular, hydroxyethyl or hydroxypropyl (meth)acrylate, vinyl esters of carboxylic acids containing up to 20 carbon atoms, such as vinyl laurate, vinyl ethers of alcohols containing up to 10 carbon atoms, such as vinyl methyl ether or vinyl isobutyl ether, vinyl halides such as vinyl chloride or vinylidene dichloride, acid amides such as acrylamide or metacrylamide, and unsaturated hydrocarbons having 3 to 8 carbon atoms such as propene, butadiene, isoprene, 1-hexene or 1-octene, or mixtures thereof. A further monomer which may be added to the polymer advantageously is a monomer having a functionality of two or more, added preferably at 0 to 2 wt % and more preferably at 0 to 1 wt %. Examples of polyfunctional ethylenically unsaturated monomers (e) are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate and tetraacrylates such as pentaerythritol tetraacrylate. The polymer dispersion is prepared by the process of emulsion polymerization of the stated components. Particularly preferred embodiments and extensive descriptions of the ingredients and also of the preparation processes are found in EP 0 017 986 B1 and also EP 0 185 356 B1.

According to one further embodiment, the PSA is in the form of a dried polymer dispersion, the polymer being composed of: (a) 90 to 99 wt % of n-butyl acrylate and/or 2-ethylhexyl acrylate, preferably 2-ethylhexyl acrylate, (b) 0 to 10 wt % of an ethylenically unsaturated monomer having an acid or acid anhydride function, (c) 10 to 1 wt % of one or more ethylenically unsaturated monofunctional monomers different from (a) and (b), such as acrylonitrile and/or metacrylonitrile, (d) 0 to 1 wt % of a monomer having a functionality of two or more, and the PSA contains between 15 and 100 parts by weight of a tackifier (based on the mass of the dried polymer dispersion), as described in EP 2 522 705 A1. One particularly preferred embodiment of the invention thus encompasses a mixture of 2-ethylhexyl acrylate as monomer (a) and acrylonitrile as monomer (c). Contemplated advantageously as monomer (b) is, for example, acrylic acid, methacrylic acid, itaconic acid, maleic acid, fumaric acid and/or maleic anhydride. Preference is given to acrylic acid or methacrylic acid, optionally the mixture of both. Examples of polyfunctional ethylenically unsaturated monomers (d) are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate and tetraacrylates such as pentaerythritol tetraacrylate. The polymer dispersion is produced by the process of emulsion polymerization of the stated components. Descriptions of this process are described—given for example—in EP 1 378 527 B1.

According to one further embodiment, the PSA is in the form of a dried polymer dispersion, the polymer being composed of: (a) 40 to 90 wt % of n-butyl acrylate and/or 2-ethylhexyl acrylate, preferably (b) 2-ethylhexyl acrylate, 0 to 10 wt % of an ethylenically unsaturated monomer having an acid or acid-anhydride function, (c) 60 to 10 wt % of one or more ethylenically unsaturated monofunctional monomers different from (a) and (b), (d) 0 to 1 wt % of a monomer having a functionality of two or more, and the PSA contains between 15 and 100 parts by weight of a tackifier (based on the mass of the dried polymer dispersion) as described in EP 2 520 628 A1. Contemplated advantageously as monomer (b) is, for example, acrylic acid, methacrylic acid, itaconic acid, maleic acid, fumaric acid and/or maleic anhydride. Preference is given to acrylic acid or methacrylic acid, optionally the mixture of both. Monomers (c) include alkyl (meth)acrylates, preferably $C_1$ to $C_{20}$ alkyl (meth)acrylates with the exception of the monomers forming (a); aromatic vinyl monomers such as styrene, α-methylstyrene and vinyltoluene, $C_1$ to $C_{10}$ hydroxyalkyl (meth)acrylates such as, in particular, hydroxyethyl or hydroxypropyl (meth)acrylate, vinyl esters of carboxylic acids containing up to 20 carbon atoms, such as vinyl acetate or vinyl laurate, vinyl ethers of alcohols containing up to 10 carbon atoms, such as vinyl methyl ether or vinyl isobutyl ether, vinyl halides such as vinyl chloride or vinylidene dichloride, acid amides such as acrylamide or methacrylamide, and unsaturated hydrocarbons having 2 to 8 carbon atoms such as ethylene, propene, butadiene, isoprene, 1-hexene or 1-octene. Ethyl acrylate is particularly preferred in the invention. Examples of polyfunctional ethylenically unsaturated monomers (d) are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate and tetraacrylates such as pentaerythritol tetraacrylate. The polymer dispersion is prepared by the process of emulsion polymerization of the stated components. Descriptions of this process are described, given for example, in EP 1 378 527 B1.

According to one further embodiment the PSA is in the form of a dried and electron beam (EBC) crosslinked polymeric acrylate dispersion, especially in aqueous acrylate dispersion, preferably having a gel value of greater than or equal to 40%, determined by Soxhlet extraction, where the polymeric acrylate dispersion comprises polymers composed of (a) monomeric acrylates and optionally (b) ethylenically unsaturated comonomers which are not acrylates, with the PSA containing between 15 and 100 parts by weight of a tackifier (based on the mass of the dried polymeric dispersion) as described in EP 2 695 926 A1.

According to one further embodiment, the PSA has a shear viscosity at a temperature of 25° C. during coating from dispersion of 200 to 100 000 Pa·s at a shear rate of $10^{-2}$ $s^{-1}$ and 0.1 to 10 Pa·s at a shear rate of 100 $s^{-1}$. The PSA consists preferably of an aqueous acrylate dispersion, in other words a polyacrylic ester in fine dispersion in water and having pressure-sensitive adhesive properties, as are described for example in the Handbook of Pressure Sensitive Technology by D. Satas. Acrylate PSAs are typically radically polymerized copolymers of alkyl acrylates or alkyl methacrylates of $C_1$ to $C_{20}$ alcohols such as, for example, methyl acrylate, ethyl (meth)acrylate, n-butyl (meth)acrylate, t-butyl (meth) acrylate, cyclohexyl (meth) acrylate, 2-ethylhexyl (meth)acrylate, n-octyl (meth)acrylate, isooctyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate and stearyl (meth)acrylate as well as further (meth)acrylic esters such as isobornyl (meth)acrylate, benzyl (meth)acrylate, phenyl (meth)acrylate and 2-bromoethyl (meth)acrylate, alkoxyalkyl (meth)acrylates such as ethoxyethyl (meth)acrylate. Further included are esters of ethylenically unsaturated dicarboxylic and tricarboxylic acids and anhydrides, such as ethyl maleate, dimethyl fumarate and ethyl methyl itaconate. Likewise included are vinylaromatic monomers such as, for example, styrene, vinyltoluene, methylstyrene, n-butylstyrene, decylstyrene, as described in EP 2 520 629 A1.

According to one further embodiment the PSA is in the form of a dried polymer dispersion, the polymer being composed of: (a) 95.0 to 100.0 wt % of n-butyl acrylate and/or 2-ethylhexyl acrylate and (b) 0.0 to 5.0 wt % of an ethylenically unsaturated monomer having an acid or acid-anhydride function, as described in EP 2 433 330 A1. Preferably the polymer consists of 95.0 to 99.5 wt % of n-butyl acrylate and/or 2-ethylhexyl acrylate and 0.5 to 5 wt % of an ethylenically unsaturated monomer having an acid or acid-anhydride function, more preferably of 98.0 to 99.0 wt % of n-butyl acrylate and/or 2-ethylhexyl acrylate and 1.0 to 2.0 wt % of an ethylenically unsaturated monomer having an acid or acid-anhydride function. Besides the acrylate polymers recited, the PSA may additionally be admixed, as well as any residual monomers present, with the tackifiers mentioned later on below and/or with adjuvants such as light stabilizers or ageing inhibitors, in the quantities likewise stated below. In particular there are no further polymers such as elastomers in the PSA, meaning that the polymers of the PSA consist only of the monomers (a) and (b) in the specified proportions.

According to one further embodiment the PSA is in the form of a dried polymer dispersion, the polymer being composed of: (a) 97.0 to 98.0 wt % of n-butyl acrylate and/or 2-ethylhexyl acrylate, (b) 2.0 to 3.0 wt % of an ethylenically unsaturated monomer having an acid or acid-anhydride function. Preferably the polymer consists of 97.2 to 97.7 wt % of n-butyl acrylate and/or 2-ethylhexyl acrylate, more preferably n-butyl acrylate, and 2.3 to 2.8 wt % of an ethylenically unsaturated monomer having an acid or acid-anhydride function. Contemplated advantageously as monomer (b) is, for example, acrylic acid, methacrylic acid, itaconic acid, maleic acid, fumaric acid and/or maleic anhydride.

According to one further embodiment, the PSAs are crosslinker-free. "Crosslinker-free" in the sense of this invention means that no compounds capable of crosslinking are added to the PSA. As used here, the term "crosslinker" represents chemical compounds which are capable of connecting molecular chains to one another so that the two-dimensional structures are able to form intermolecular bridges and hence three-dimensionally crosslinked structures. Crosslinkers are those compounds—especially difunctional or polyfunctional and usually of low molecular mass, that under the chosen crosslinking conditions are able to react with suitable groups—especially functional groups—of the polymers to be crosslinked, and therefore link two or more polymers or polymer positions to one another (form "bridges") and hence create a network of the polymer or polymers to be crosslinked. As a result there is generally an increase in the cohesion. Typical examples of crosslinkers are chemical compounds which within the molecule or at the two ends of the molecule have two or more identical or different functional groups and are therefore able to crosslink molecules with similar or else different structures to one another. Moreover, a crosslinker is able to react with the reactive monomer or reactive resin, as defined above, without an accompanying polymerization reaction in the actual sense. The reason is that, in contrast to the activator, as described above, a crosslinker can be built into the polymer network.

The coat weight of the adhesive applied to the carrier and/or introduced into the carrier is advantageously between 50 $g/m^2$ and 500 $g/m^2$, more advantageously between 100 $g/m^2$ and 250 $g/m^2$, particularly advantageously between 30 $g/m^2$ and 130 $g/m^2$.

The ready-coated material is cut preferably into a width of 20±2 mm (any other width is likewise conceivable) and, in application for the wrapping of elongated items, is wound spirally with an overlap of 50% around the elongated item—such as a cable bundle.

The ready-coated material is preferably provided with a protective sheet.

Another subject of the present invention is a method for jacketing an elongated item such as more particularly leads or cable sets, where an adhesive tape according to any of the preceding claims is guided in a helical line around the elongated item or the elongated item is wrapped in an axial direction by the adhesive tape, the elongated item together with the adhesive tape wrapping is brought into the desired disposition, more particularly into the cable set plan, the elongated item is held in this disposition, the curable adhesive is brought to cure by the supply of UV radiation energy. The UV radiation energy is supplied preferably over a period of 0.5 sec to 6 min, which is compatible with the cycle times of the manufacturing operation, and so the elongated item is fully cured as soon as it is installed in the target object such as motor vehicles, watercraft or aircraft.

The tape is preferably wrapped spirally around the elongated item with an overlap of 30% to 70%, more preferably 40 to 50%, more particularly about 50%.

Lastly, the present invention also pertains to a cable harness jacketed with the cured adhesive tape of the invention, and to a cable harness produced by the method of the invention.

EXAMPLES

Example 1—Preparation of a Polyacrylate

A 2 L glass reactor conventional for radical polymerizations was charged with 40 g glycidyl acrylate, 240 g of 2 ethylhexyl acrylate, 120 g of $C_{17}$ acrylate (triply branched sides with $C_3$, $C_4$ chain segments, BASF SE), 133 g of special boiling point spirit 69/95, and 133 g of acetone. After nitrogen gas had been passed through the reaction solution with stirring for 45 minutes, the reactor was heated to 58° C. and 0.2 g of Vazo 67 (from DuPont) was added. The external heating bath was then heated to 75° C. and the reaction was carried out constantly at this external temperature. After a reaction time of 1 h, 50 g of toluene were added. After 2.5 h, dilution was carried out with 100 g of acetone. After a reaction time of 4 h, a further 0.2 g of Vazo 67 was added. After a polymerization time of 7 h, dilution was carried out with 100 g of special boiling point spirit 60/95, and after 22 h with 100 g of acetone. After a reaction time of 24 h, the polymerization was terminated and the reaction vessel was cooled down to room temperature. The molecular weight $M_n$ of the product was 624000 g/mol.

Example 2—Production of Adhesives

Adhesives with the following formulas were produced

| K1 |
|---|
| 30 weight fractions Levapren ® 600 |
| 70 weight fractions Epikote ® 828 |
| 1 weight fraction triarylsulfonium hexafluoroantimonate |

| K2 |
|---|
| 30 weight fractions acrylate of example 1 |
| 35 weight fractions Epikote ® 828 |
| 35 weight fractions Araldite ® ECN1273 |
| 1 weight fraction triarylsulfonium hexafluoroantimonate |

| K3 |
|---|
| 37.5 weight fractions Kraton ® G1657 |
| 37.5 weight fractions Regalite ® R1100 |
| 25 weight fractions Uvacure 1500 |
| 1 weight fraction triarylsulfonium hexafluoroantimonate |

Example 3—Production of Adhesive Tapes

The adhesive compositions produced in example 2 are applied to a nonwoven polymer web with a width of 20 mm and a thickness of 100 μm, to produce an adhesive tape (a stiffening material), and provided with a protective sheet.

Example 4—Bending Test for Ascertaining the Stiffness

A test specimen consisting of 250 individual leads with a lead cross section of 0.35 mm² was bundled using an adhesive tape 9 mm wide (tesa 51618) to form a specimen lead set, and so the specimen lead set had a diameter of 23±5 mm and a length of 300±50 mm. This specimen lead set was wrapped spirally with the stiffening material, and an overlap of 50% was ensured. The stiffening material was subsequently cured using UV radiation.

The cured specimen lead set was subjected to a bending test in order to determine the influence of the stiffening material on the stiffness. The bending test was performed on a tensile testing machine. For this test, the specimen lead set was placed onto two jaws with a spacing of 70 mm and pressed in centrally with a crosshead by a distance of 30 mm and loaded. The force required for the deformation of the measurement travel was recorded by a tensile testing machine in newtons. The testing velocity was 100 mm/min, both during loading and during unloading of the specimen lead set. The test was carried out at three different points on the lead set (start, middle and end). The bending force results from the mean value of the three individual measurements, and was evaluated in three categories as follows:

Evaluation Categories, Three-Point Bending Test

| | |
|---|---|
| + | highly suitable for the application (500-750N) |
| O | of limited suitability for the application (400-500N and 700-800N) |
| − | not suitable for the application (<400 and >800N) |

For comparison, a commercially available adhesive tape, Tesa® 51036, was subjected to the same test. The results are set out in table 1 hereinafter.

Example 5—C-shape Testing for Determining the Stiffness at Different Temperatures For ascertaining the stiffness of a bent cable specimen, a test method was developed (C-cable specimen bending test). To produce a C-cable specimen (see FIG. 1) a cable lead (10) with a lead cross section of 0.35 mm² is wound 100 times around a mount (1) to form a specimen lead set. The mount (1) has two opposite, semi-circular guides (2, 3) with a diameter of 120 mm, which are spaced apart with a spacing (A) of about 210 mm. The wound cable set is represented in FIG. 1.

The number of cable turns is 100. The resulting specimen lead set has a diameter of 15±5 mm and a perimeter of 690 mm. At the apices of the semicircle segments and at two linear sections (legs) in each case, the cable bundle (10) is tied together and fixed using cable ties (4, 5, 6, 7, 8, 9) with a tensile force of 210±10 N, so that after removal from the mount the cable bundle (10) possesses sufficient stiffness not to deform. To further improve the stiffness of the cable bundle (10), a support (11) is positioned between the legs of the cable bundle and is fixed likewise using cable ties.

The cable bundle (10) thus produced is removed from the mount and wrapped, with a 50% overlap, with the adhesive tape under test (width 19 mm-20 mm). Wrapping for this purpose is commenced at a cable tie (e.g. (6) or (7)) of the leg in the circle segment direction ((6)→(4) or (7)→(5)). When the wrapping reaches the cable tie (4) or (5) at the apex of the semicircle segment, the tie is removed and the winding is continued up to the next cable tie ((4)→(8) or (5)→(9)) of the opposite leg. Exactly the same procedure is carried out on the other side, on the other semicircle segment.

The specimens thus prepared undergo the corresponding crosslinking method (UV irradiation, 365 nm). Using wire cutters, the specimens are cut adjacent to the remaining cable ties, to give two "C-shaped" cable specimens (C-cable specimens), which each also have an unwrapped section on both sides of the semi-circular wrapped section. The cut is made at the distance of the diameter (120 mm) from the apex of the semicircle segment, projected onto the circle centre.

With one piece of cable respectively, loops are tied to the leg ends of the specimens, allowing the specimen to be hung up at one end and allowing a weight to be hung on at the other end. The remaining cable ties are now removed, since they can distort the result of testing. The distance between the legs is now determined.

One of the two specimens is stored at room temperature and the other at 60° C.

A 1 kg weight is hung from the respective lower leg of the "C-test specimen". After an hour the deflection of the cable bundle is recorded (deflection behaviour with 1 h at RT and 60° C.) and the weight is removed. After one minute the deflection is determined again (resilience behaviour 1 min at RT or 60° C.). After an hour, the deflection is then determined again and recorded (resilience behaviour 1 h at RT or 60° C.)

The values ascertained for the C-shape deformation were graded into three categories: highly suitable for the application, of limited suitability for the application, and unsuitable for the application. The categories were evaluated as follows:

Evaluation Categories, C-Shape Bending Test
(Room Temperature)

| | |
|---|---|
| + | highly suitable for the application (<15% deflection) |
| ○ | of limited suitability for the application (>15-30%) |
| − | unsuitable for the application (>30%) |

Evaluation Categories, C-Shape Bending Test (60° C.)

| | |
|---|---|
| + | highly suitable for the application (< 25% deflection) |
| ○ | of limited suitability for the application (>25-40%) |
| − | unsuitable for the application (>40%) |

Evaluation Categories, C-Shape Bending Test
(Resilience Behaviour at RT and 60° C.)

| | |
|---|---|
| + | highly suitable for the application (<10% deflection) |
| ○ | of limited suitability for the application (10-30%) |
| − | unsuitable for the application (>30%) |

For comparison a commercially available adhesive tape, Tesa® 51036, was subjected to the same test. The results are likewise set out in table 1 hereinafter.

TABLE 1

| | 3-point bending test | C-shape deformation at RT | C-shape resilience behaviour at RT |
|---|---|---|---|
| Formula K1 | + | + | + |
| Formula K2 | + | + | + |
| Formula K3 | + | + | + |
| tesa ® 51036 | − | − | − |

| | C-shape deformation at 60° C. | C-shape resilience behaviour at 60° C. |
|---|---|---|
| Formula K1 | + | + |
| Formula K2 | + | + |
| Formula K3 | + | + |
| tesa ® 51036 | − | − |

Key:
+ highly suitable for the application
○ of limited suitability for the application
− unsuitable for the application

The invention claimed is:

1. A method for jacketing an elongated item, said method comprising guiding an adhesive tape comprising a tapelike carrier provided on at least one side with an adhesive layer which consists of a self-adhesive, pressure-sensitive adhesive, wherein the self-adhesive pressure-sensitive adhesive is a UV-curable composition comprising, based on a total weight of the composition:
15 to 50 parts by weight of matrix polymer;
50 to 85 parts by weight of epoxy resin; and
0.1 to 3 parts by weight of photoinitiator,
with the matrix polymer forming a self-supporting film in which epoxy resin and photoinitiator are embedded where the adhesive tape is guided in a helical line around the elongated item or wrapping the elongated item in an axial direction by the adhesive tape, bringing the elongated item together with the adhesive tape into a desired disposition, holding the elongated item in this disposition, and curing the curable adhesive by supplying UV radiation energy.

2. The adhesive tape of claim 1, wherein the UV-curable composition, based on its total weight, comprises 20-40 parts by weight of matrix polymer.

3. The adhesive tape of claim 1, wherein the UV-curable composition, based on its total weight, comprises 60 to 75 parts by weight of epoxy resin.

4. The adhesive tape of claim 1, wherein the matrix polymer is selected from the group consisting of styrene copolymers, acrylate copolymers, methacrylate copolymers, thermoplastic polyurethanes, copolyesters, copolyamides and ethylene-vinyl acetate copolymers and mixtures thereof.

5. The adhesive tape of claim 1, wherein the epoxy resin is selected from the group consisting of 3,4-epoxycyclohexylmethyl 3',4'-epoxycyclohexanecarboxylate (EEC) and derivatives, dicyclopentadiene dioxide and derivatives, 3-ethyl-3-oxetanemethanol and derivatives, diglycidyl tetrahydrophthalate and derivatives, diglycidyl hexahydrophthalate and derivatives, ethane 1,2-diglycidyl ether and derivatives, propane 1,3-diglycidyl ether and derivatives, 1,4-butanediol diglycidyl ether and derivatives, higher alkane 1,n-diglycidyl ethers and derivatives, bis[(3,4-epoxycyclohexyl)methyl] adipate and derivatives, vinylcyclohexyl dioxide and derivatives, 1,4-cyclohexanedimethanol bis(3,4-epoxycyclohexanecarboxylate) and derivatives, diglycidyl 4,5-epoxytetrahydrophthalate and derivatives, bis [1-ethyl(3-oxetanyl)methyl] ether and derivatives, pentaerythritol tetraglycidyl ether and derivatives, bisphenol A diglycidyl ether (DGEBA), hydrogenated bisphenol A diglycidyl ether, bisphenol F diglycidyl ether, hydrogenated bisphenol F diglycidyl ether, epoxyphenol novolacs, hydrogenated epoxyphenol novolacs, epoxycresol novolacs, hydrogenated epoxycresol novolacs, 2-(7-oxabicyclo[4.1.0] hept-3-yl);spiro[1,3-dioxane-5,3'-[7]oxabicyclo[4.1.0]heptane 1,4-bis((2,3-epoxypropoxy)methyl)cyclohexane.

6. The adhesive tape of claim 1, wherein the carrier material is UV-transparent.

7. The adhesive tape of claim 1, wherein the carrier material comprises a polyester nonwoven.

8. The method of claim 1, wherein the UV radiation energy is supplied over a period of 0.5 sec to 6 min.

9. The method of claim 1, wherein the adhesive tape has an adhesive layer only on one side thereof.

10. The method of claim 1, wherein the curable adhesive layer of the adhesive tape is uncured when the adhesive tape is guided in a helical line around the elongated item or wrapping the elongated item in an axial direction by the adhesive tape, bringing the elongated item together with the adhesive tape into a desired disposition, holding the elongated item in this disposition, and only subsequently is the curable adhesive layer of the adhesive tape cured by supplying UV radiation energy.

* * * * *